United States Patent
Moriyama et al.

(10) Patent No.: US 9,195,014 B2
(45) Date of Patent: Nov. 24, 2015

(54) OPTICAL CONNECTOR, OPTICAL CONNECTOR SYSTEM AND OPTICAL BACKPLANE APPARATUS FOR OPTICALLY CONNECTING FIRST OPTICAL WAVEGUIDE AND SECOND OPTICAL WAVEGUIDE

(71) Applicants: FUJITSU COMPONENT LIMITED, Tokyo (JP); FUJITSU LIMITED, Kanagawa (JP)

(72) Inventors: Satoshi Moriyama, Tokyo (JP); Osamu Daikuhara, Tokyo (JP); Ayumu Akabane, Tokyo (JP); Yoshihiro Morita, Yokohama (JP)

(73) Assignees: FUJITSU COMPONENT LIMITED, Tokyo (JP); FUJITSU LIMITED, Kawasaki (JP)

( * ) Notice: Subject to any disclaimer, the term of this patent is extended or adjusted under 35 U.S.C. 154(b) by 101 days.

(21) Appl. No.: 14/094,880

(22) Filed: Dec. 3, 2013

(65) Prior Publication Data
US 2014/0153874 A1    Jun. 5, 2014

(30) Foreign Application Priority Data
Dec. 5, 2012 (JP) ................. 2012-266593

(51) Int. Cl.
G02B 6/38 (2006.01)
G02B 6/43 (2006.01)

(52) U.S. Cl.
CPC ............ *G02B 6/3897* (2013.01); *G02B 6/3885* (2013.01); *G02B 6/43* (2013.01)

(58) Field of Classification Search
CPC ....... G02B 6/3885; G02B 6/43; G02B 6/3897
USPC ............................... 385/59–77, 147
See application file for complete search history.

(56) References Cited

U.S. PATENT DOCUMENTS

| | | | |
|---|---|---|---|
| 6,241,399 B1 * | 6/2001 | Nobuhara | 385/84 |
| 6,390,690 B1 | 5/2002 | Meis et al. | |
| 6,886,989 B2 * | 5/2005 | Crafts | 385/54 |
| 7,329,052 B2 * | 2/2008 | Pizzarulli | 385/88 |
| 8,041,178 B2 * | 10/2011 | Lu et al. | 385/147 |
| 2006/0120673 A1 * | 6/2006 | Morlion et al. | 385/89 |
| 2008/0037934 A1 | 2/2008 | Daikuhara et al. | |
| 2010/0215312 A1 | 8/2010 | Daikuhara et al. | |

FOREIGN PATENT DOCUMENTS

| | | |
|---|---|---|
| JP | 2004-520604 | 7/2004 |
| JP | 2008-040264 | 2/2008 |
| JP | 2010-197817 | 9/2010 |

\* cited by examiner

*Primary Examiner* — Akm Enayet Ullah
(74) *Attorney, Agent, or Firm* — IPUSA, PLLC

(57) ABSTRACT

An optical connector for optically connecting a first optical waveguide and second optical waveguide, includes a first connector module including a first fixing portion attached to a first board in such a manner that a fixed position is adjustable, a first connecting portion, a first ferrule to which the first optical waveguide is connected, and a guide pin attached to the first ferrule and provided with a tapered portion at a front end; and a second connector module including a second fixing portion fixed to a second board, a second connecting portion connectable to the first connecting portion of the first connector module, a second ferrule to which the second optical waveguide is connected and provided with a fitting hole that fits the guide pin, and a holding unit that movably holds the second ferrule.

11 Claims, 17 Drawing Sheets

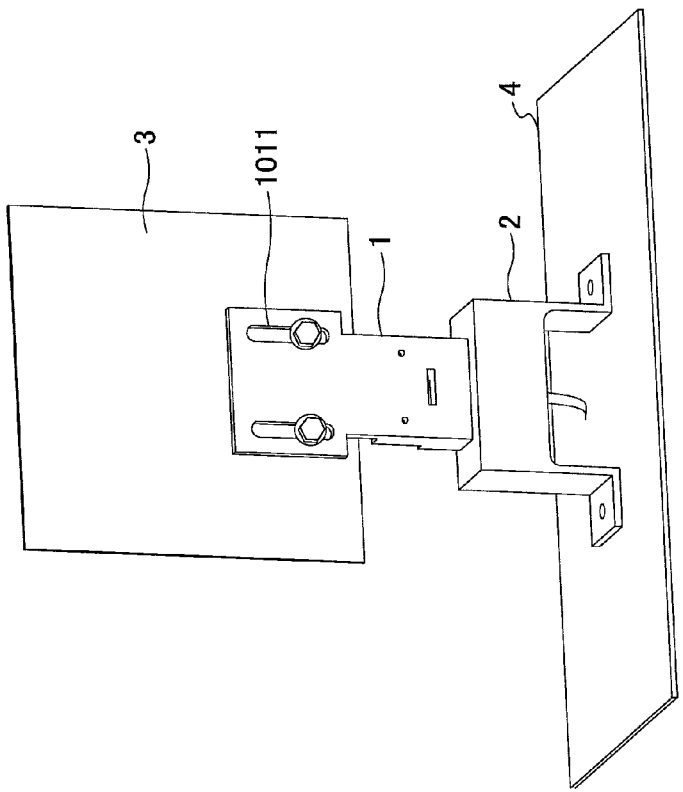
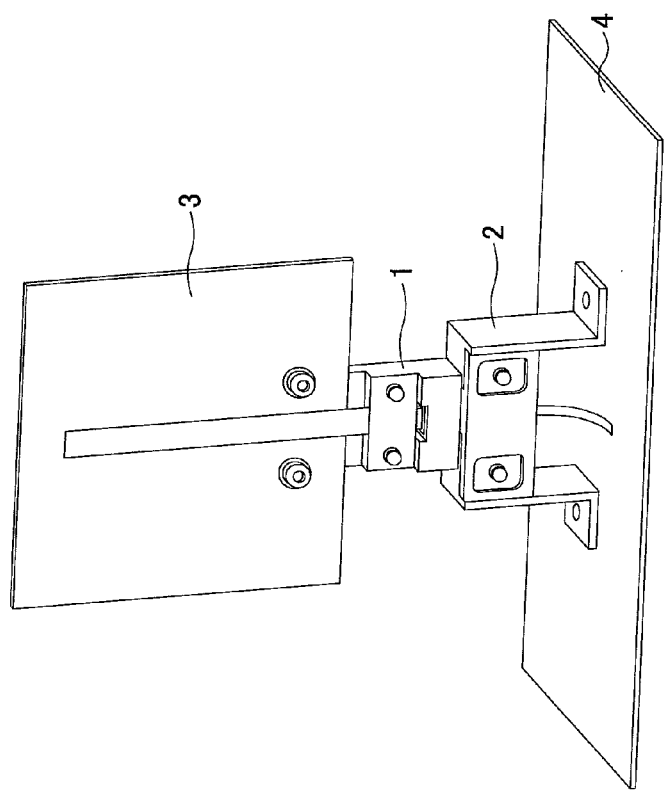

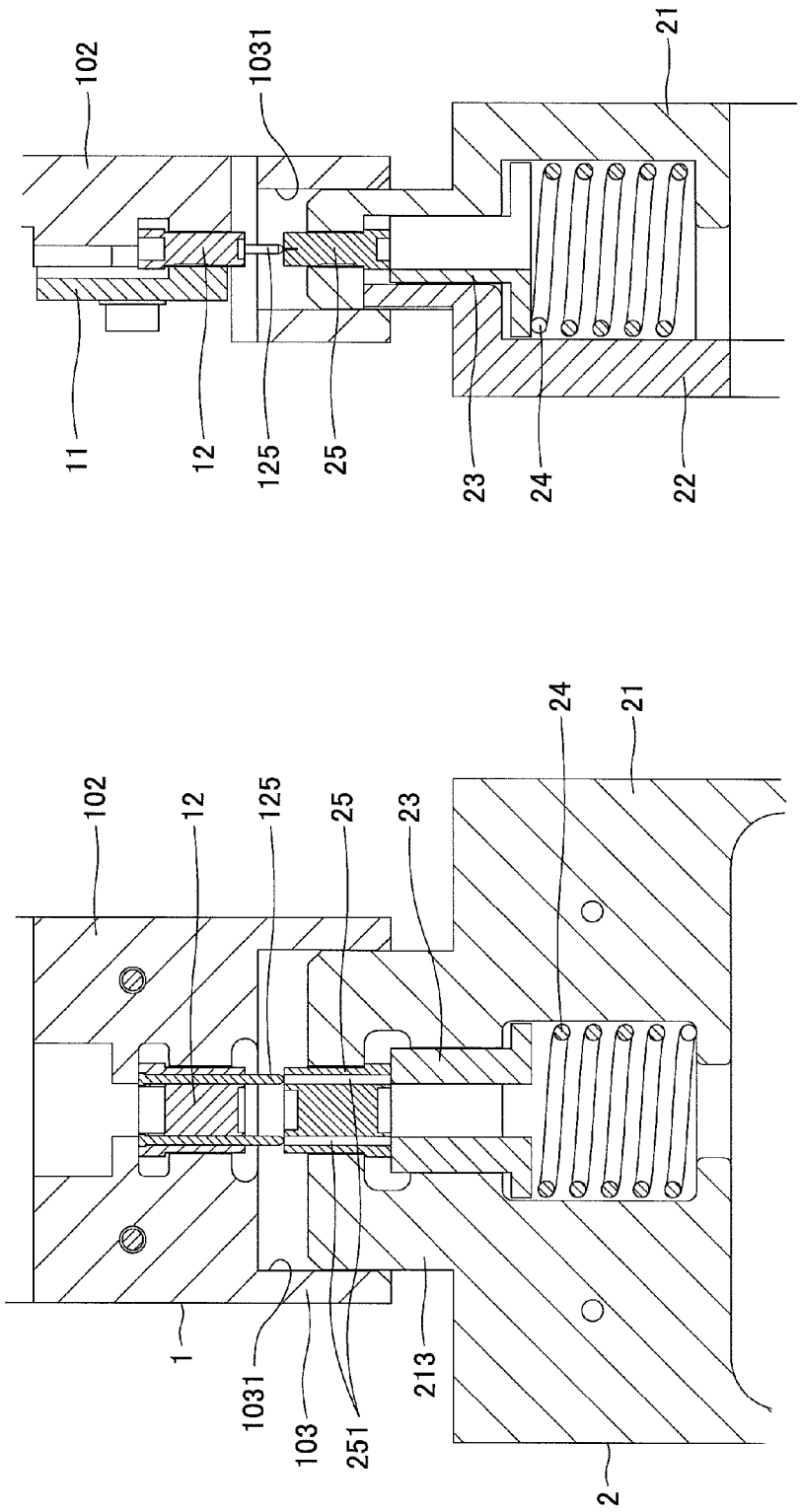

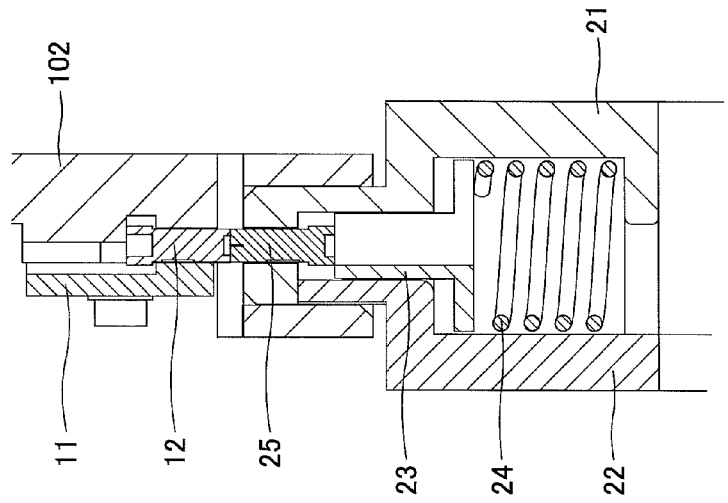
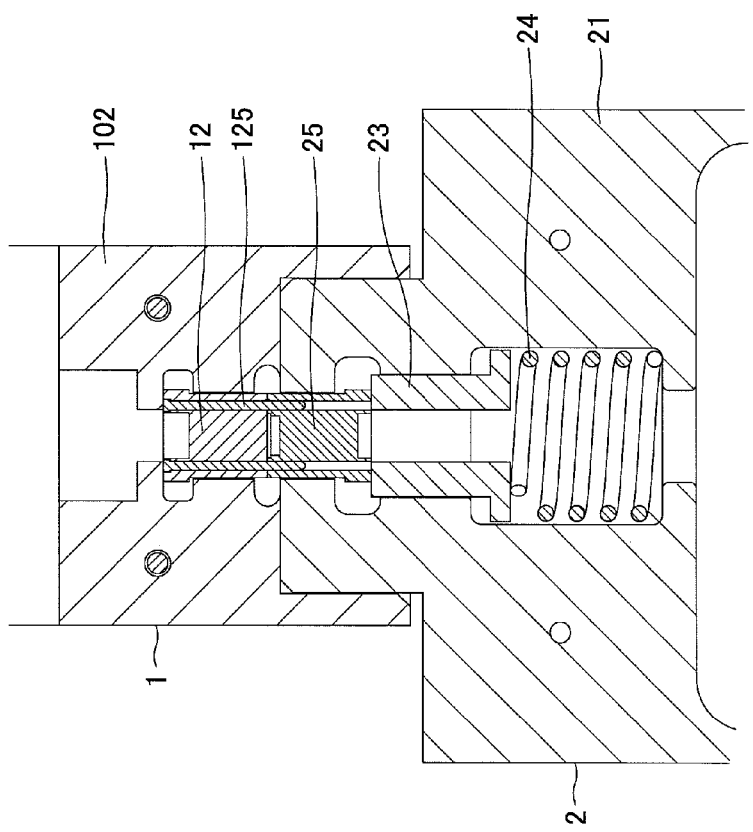
FIG.15A
FIG.15B

OPTICAL CONNECTOR, OPTICAL CONNECTOR SYSTEM AND OPTICAL BACKPLANE APPARATUS FOR OPTICALLY CONNECTING FIRST OPTICAL WAVEGUIDE AND SECOND OPTICAL WAVEGUIDE

CROSS-REFERENCE TO RELATED APPLICATION

The present application is based on and claims the benefit of priority of Japanese Priority Application No. 2012-266593 filed on Dec. 5, 2012, the entire contents of which are hereby incorporated by reference.

FIELD

The present invention relates to an optical connector, an optical connector system and an optical backplane apparatus.

BACKGROUND

Conventionally, optical connectors in each of which a ferrule is connected to an optical fiber have been used in order to connect optical fibers while relaying lights therebetween. In order to reduce transmission loss between optical waveguides in connection, it is necessary for the optical connectors to be configured such that the ferrules are connected while facing each other in an accurate manner. In particular, high connection accuracy is required for the optical waveguides formed by a multi core optical fiber or a plurality of optical fibers.

For example, Patent Document 1(Japanese Laid-open Patent Publication No. 2010-197817) discloses an optical connector capable of easily and precisely positioning optical fibers and optical elements using ferrules.

Patent Document 2 (Japanese Laid-open Patent Publication No. 2008-040264) discloses an optical connector capable of inserting and pulling a plurality of optical connectors at the same time.

On the other hand, in accordance with recent increases in the amount of communications using optical communications, a communication system in which a plurality of optical waveguides are aggregated has been provided. For example, there has been provided a large-scale optical waveguide integrated system in which a plurality of system boards, to each of which an optical fiber is connected, are connected to a single backplane board.

In such an optical waveguide integrated system, integration density of the optical waveguides is increased by horizontally mounting a plurality of the system boards on a system rack or the like and connecting the system boards to the backplane board that is orthogonal to the system boards.

Further, in such an optical waveguide integrated system, opto-electric conversion is performed in system boards and the system boards and the backplane board are electrically connected by electrical connectors, respectively.

However, in order to handle light signals in the backplane board, it is necessary to use the optical connectors as explained above for passing the light signal to the backplane board without performing the opto-electric conversion. For such a system in which optical connectors are additionally provided, an operator who attaches the system boards to the backplane board has to, first, fix the system boards by sliding the system boards into slots of the system rack, and then, has to serially connect the optical connectors while taking care of bending or the like of the optical fibers.

For example, Patent Document 3 (Japanese translation of PCT international application No. 2004-520604) discloses a connector that optically connects a first board and a second board orthogonal to each other.

However, when optical waveguides provided to boards are connected by the conventional optical connector disclosed in Patent Documents 1 to 3, if the spaces between the system boards are narrowed in order to increase integration density of the system boards, it is difficult for an operator to insert and pull the optical connector to cause reduction of workability. In particular, when inserting or pulling one of the system boards that are already attached to the rack, workability of inserting and pulling the connector becomes worse due to the adjacent system boards, and thus, it is necessary to retain the spaces between the system boards to a certain extent.

Further, generally, connection accuracy between the system rack and the system boards is lower than connection accuracy between optical connectors. Thus, it was difficult to connect optical connectors at the same time with attaching the boards like a case in which the system boards are attached to the backplane board using the electrical connectors.

[Patent Document]

[Patent Document 1] Japanese Laid-open Patent Publication No. 2010-197817

[Patent Document 2] Japanese Laid-open Patent Publication No. 2008-040264

[Patent Document 3] Japanese translation of PCT international application No. 2004-520604

SUMMARY

According to an embodiment, there is provided an optical connector for optically connecting a first optical waveguide and second optical waveguide, including a first connector module including a first fixing portion attached to a first board in such a manner that a fixed position is adjustable, a first connecting portion, a first ferrule to which the first optical waveguide is connected, and a guide pin attached to the first ferrule and provided with a tapered portion at a front end; and a second connector module including a second fixing portion fixed to a second board, a second connecting portion connectable to the first connecting portion of the first connector module, a second ferrule to which the second optical waveguide is connected and provided with a fitting hole that fits the guide pin, and a holding unit that movably holds the second ferrule.

According to another embodiment, there is provided an optical connector system including the above described optical connector; a first optical waveguide connected to the first ferrule of the first connector module; and a second optical waveguide connected to the second ferrule of the first connector module.

According to another embodiment, there is provided an optical backplane apparatus including: a plurality of the above described optical connectors; a plurality of first boards; and a second board to which the plurality of the first boards are connected via the plurality of the optical connectors, respectively.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 2A and FIG. 2B are respective perspective views illustrating the optical connector of the embodiment after being fitted;

FIG. 13A and FIG. 13B are cross-sectional views illustrating an example of the optical connector before being fitted;

FIG. 15A and FIG. 15B are cross-sectional views illustrating an example of the optical connector after being fitted.

DESCRIPTION OF EMBODIMENTS

Figure 1:
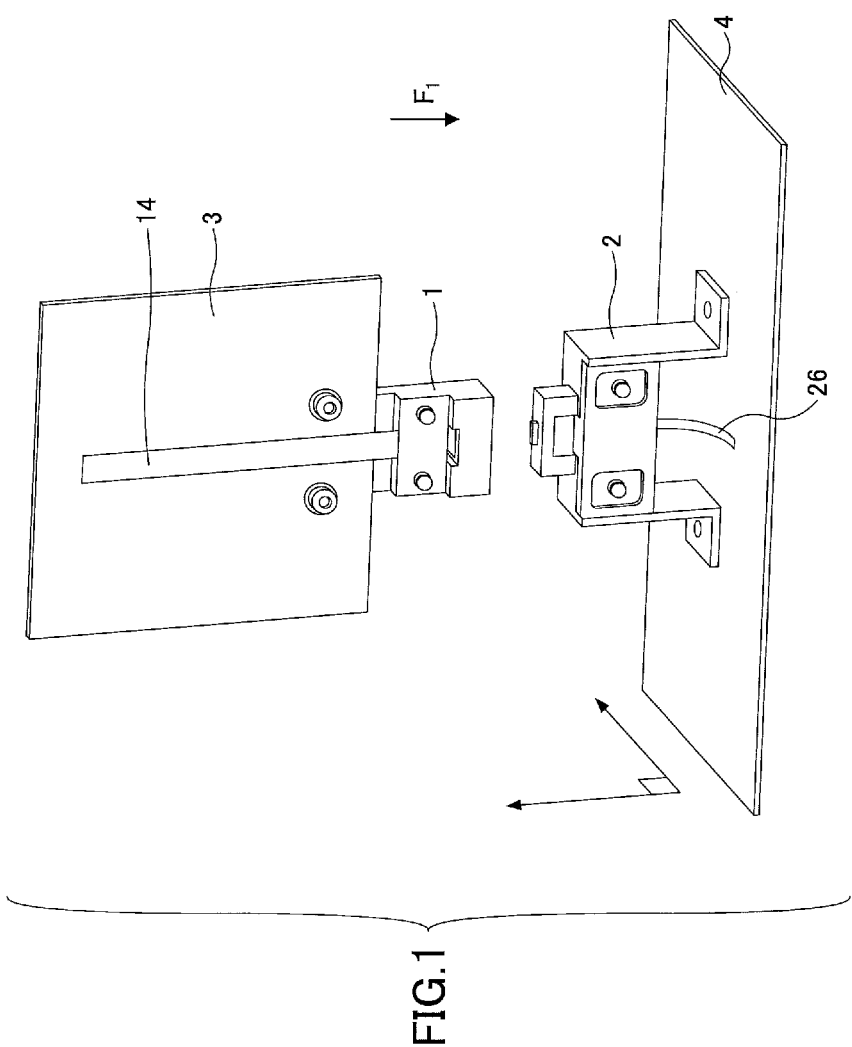
FIG. 1 is a perspective view illustrating an example of an optical connector of an embodiment before being fitted.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

FIG. 1 is a perspective view illustrating an example of an optical connector of the embodiment before being fitted.

The optical connector includes a first connector 1 to which a first optical waveguide 14 is connected and a second connector 2 to which a second optical waveguide 26 is connected. The first connector 1 is attached to a system board 3.

The second connector 2 is attached to a backplane board 4.

Hereinafter, the "system board" is also referred to as "SD" and the "backplane board" is also referred to as "BP". Further, hereinafter, the first connector 1 is referred to as a "SB-side connector 1" and the second connector 2 is referred to as a "BP-side connector 2". The SB-side connector 1 engages with the BP-side connector 2.

Although not illustrated in the drawings, a plurality of the BP-side connectors 2 may be attached to the backplane board 4. Thus, the backplane board 4 is capable of mounting a plurality of the SB-side boards 3 in an orthogonal direction by fitting the BP-side connectors 2 with the SB-side connectors 1, respectively.

The SB-side boards 3 are held by a system rack, not illustrated in the drawings, provided with a plurality of slots. Specifically, the SB-side boards 3 are held by the slots of the system rack, respectively. The slots of the system rack are formed such that the SB-side connectors 1 fit the BP-side connectors 2 when the SB-side boards 3 are slid in the slots, respectively. This means that an operator can fit the SB-side connector 1 and the BP-side connector 2 by inserting and sliding each of the SB-side boards 3 in the respective slot of the system rack.

FIG. 2A and FIG. 2B are respective perspective views illustrating the optical connector of the embodiment after being fitted. FIG. 2A illustrates the optical connector seen from a side the same as FIG. 1 and FIG. 2B illustrates the optical connector seen from a side opposite from FIG. 1.

When the SB-side connector 1 is slid toward the BP-side connector 2 in a fitting direction $F_1$ as illustrated in FIG. 1, the SB-side connector 1 and the BP-side connector 2 are fitted as illustrated in FIG. 2A and FIG. 2B.

As illustrated in FIG. 2B, the SB-side connector 1 is provided with long holes 1011 and the system board 3 is fixed to the SB-side connector 1 by bolts inserted in the long holes 1011 of the SB-side connector 1, respectively. With this configuration, the position of the SB-side connector 1 with respect to the system board 3 can be adjusted. Thus, these bolts are used when adjusting the position of the SB-side connector 1 when the system board 3 is inserted in the slot of the system rack not illustrated in the drawings. For example, the bolts may be temporarily fixed to the SB-side connector 1 and the system board 3 first. Then, after fitting the SB-side connector 1 and the BP-side connector 2 and confirming that the SB-side connector 1 and the BP-side connector 2 are appropriately fitted, the bolts may be tighten. With this operation, the SB-side connector 1 and the BP-side connector 2 can be connected with a high degree of accuracy without being influenced by attachment accuracy to the system rack.

Figure 3:
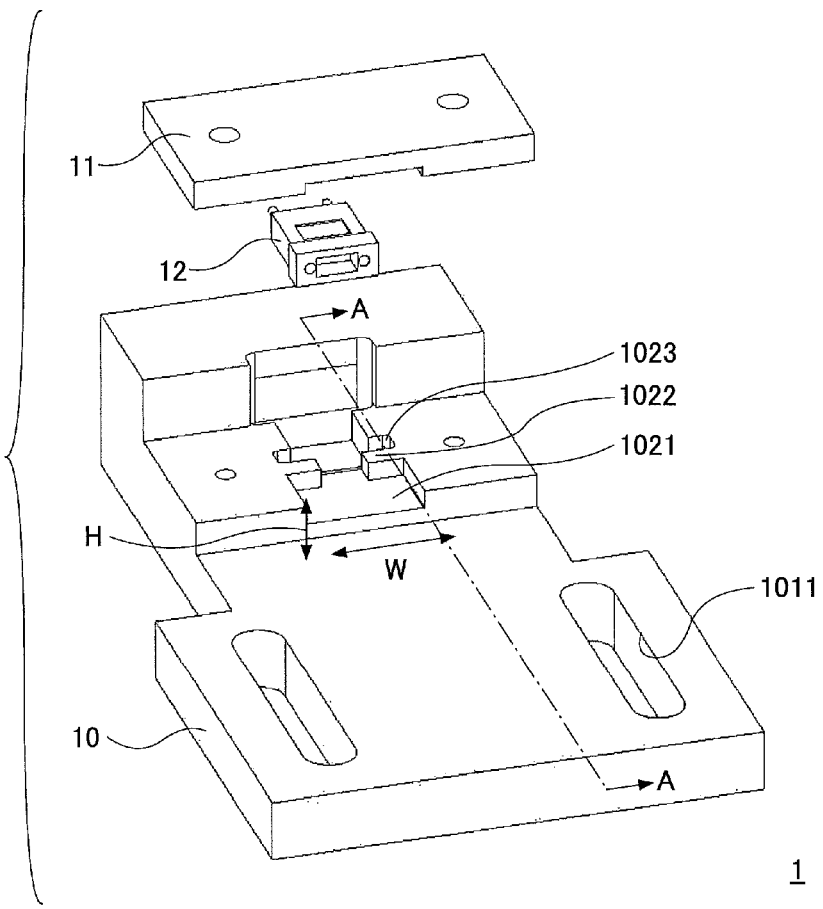
FIG. 3 is a perspective view illustrating an example of a structure of an SB-side connector.

FIG. 3 is a perspective view illustrating an example of the structure of the SB-side connector 1.

The SB-side connector 1 includes an SB-side first housing 10, an SB-side second housing 11, and an SB-side ferrule 12. Here, the first optical waveguide 14 is not illustrated in FIG. 3, although the first optical waveguide 14 is connected to a rear portion of the SB-side ferrule 12

As will be explained later in detail, the SB-side first housing 10 is provided with a concave portion that extends in a width direction W and in a height direction H, and the SB-side ferrule 12 is housed in the concave portion. The SB-side first housing 10 and the SB-side second housing 11 are fixed with each other by screws with the SB-side ferrule 12 provided therebetween in the height direction H.

The SB-side ferrule 12 is explained in detail with reference to FIG. 7A to FIG. 8.

Figure 7A:
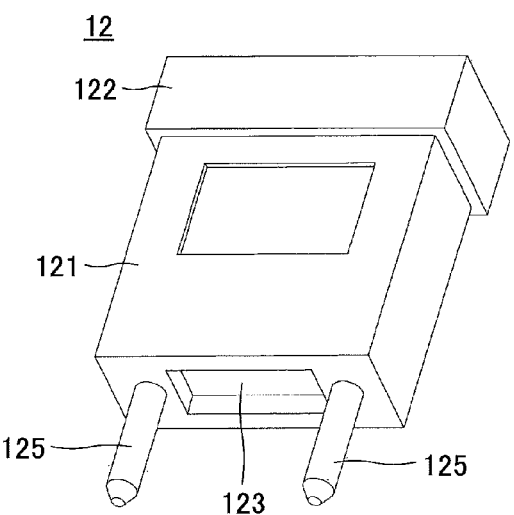
FIG. 7A to FIG. 7D are views illustrating an example of the SB-side ferrule.
Figure 7B:
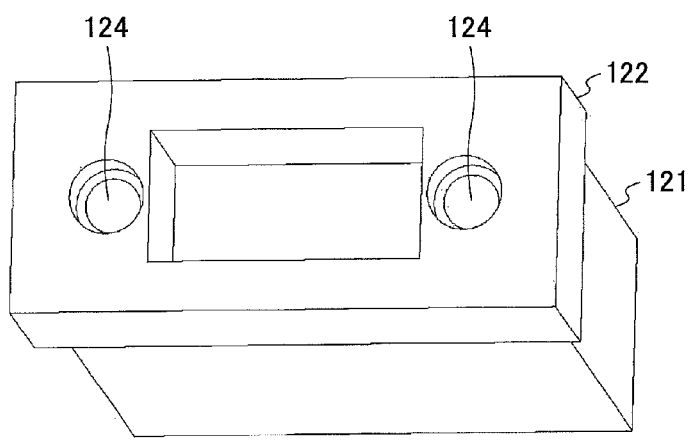
Figure 7C:
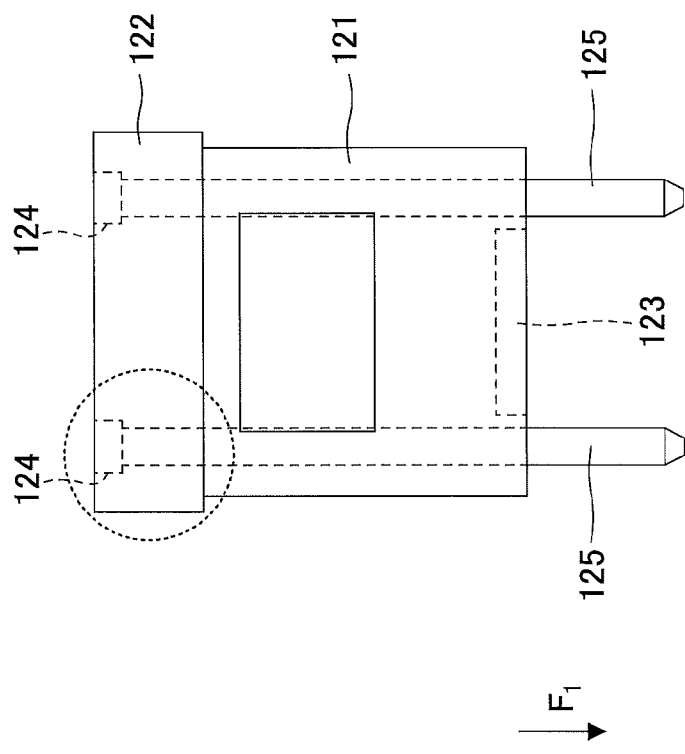
Figure 7D:
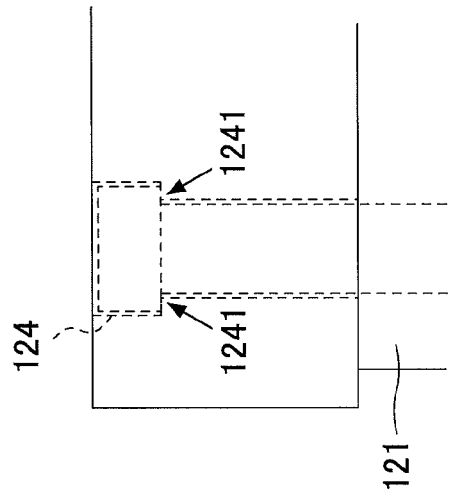

FIG. 7A is a perspective view of the SB-side ferrule 12 in which guide pins 125 are inserted, seen from a front end. FIG. 7B is a perspective view of the SB-side ferrule 12 in which the guide pins 125 are not inserted, seen from a rear end. FIG. 7C is a transparent plan view of the SB-side ferrule 12 in which the guide pins 125 are inserted and FIG. 7D is an enlarged view of FIG. 7C.

The SB-side ferrule 12 includes an SB-side ferrule body 121, an SB-side ferrule flange 122, an optical waveguide placing surface 123, guide pin insertion holes 124 and the guide pins 125. An optical waveguide array, not illustrated in the drawings, is placed on the optical waveguide placing surface 123 that has a rectangular shape and is provided at a front end of the SB-side ferrule body 121. The SB-side ferrule 12 is integrally formed with the optical waveguide array. The optical waveguide array is formed by a plurality of optical waveguide lens and faces a BP-side ferrule 25, which will be explained later with reference to FIG. 11, at the front end in FIG. 7A.

Figure 8:
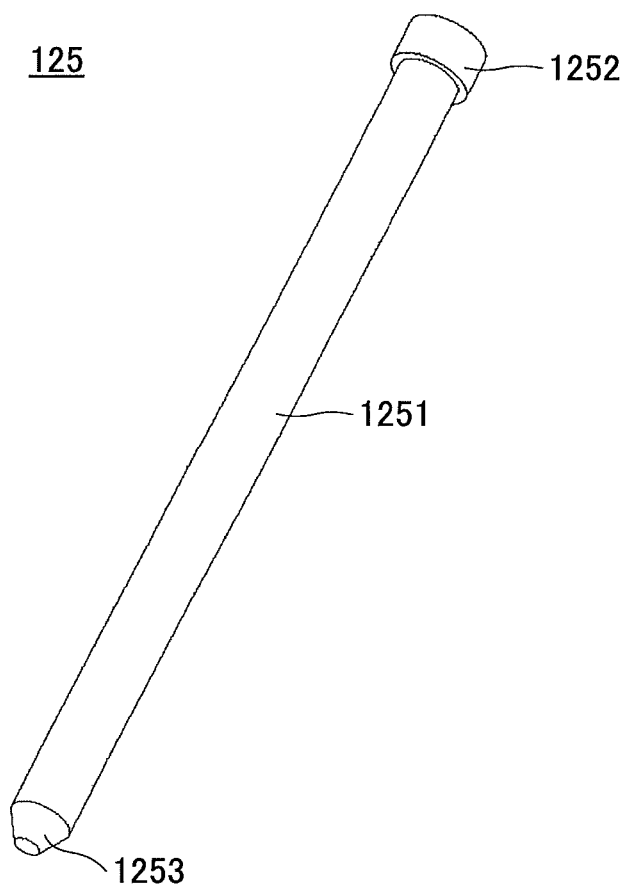
FIG. 8 is a perspective view illustrating an example of a guide pin.

FIG. 8 is a perspective view illustrating an example of the guide pin 125. The guide pin 125 includes a guide pin body 1251, a flange portion 1252 and a tapered portion 1253. The diameter of the guide pin body 1251 may be slightly smaller than that of the guide pin insertion hole 124 illustrated in FIG. 7B to FIG. 7D. With this configuration of the diameter, inappropriate force is not applied to the guide pin 125 when the guide pin 125 is inserted into the respective guide pin insertion hole 124 so that deformation of the guide pin 125 can be prevented.

In this embodiment, the guide pin 125 is detachably attached to the SB-side ferrule 12. Specifically, the guide pin 125 is attached to the SB-side ferrule 12 in such a manner that the guide pin 125 is capable of being inserted in and pulled out from the SB-side ferrule 12.

As illustrated in FIG. 7D, the guide pin insertion hole 124 is provided with a step portion 1241 to receive the flange portion 1252 of the guide pin 125 such that the respective guide pin 125 is prevented from pulled out in the fitting direction $F_1$, in other words, a lower direction in FIG. 7C and FIG. 7D.

Figure 4:
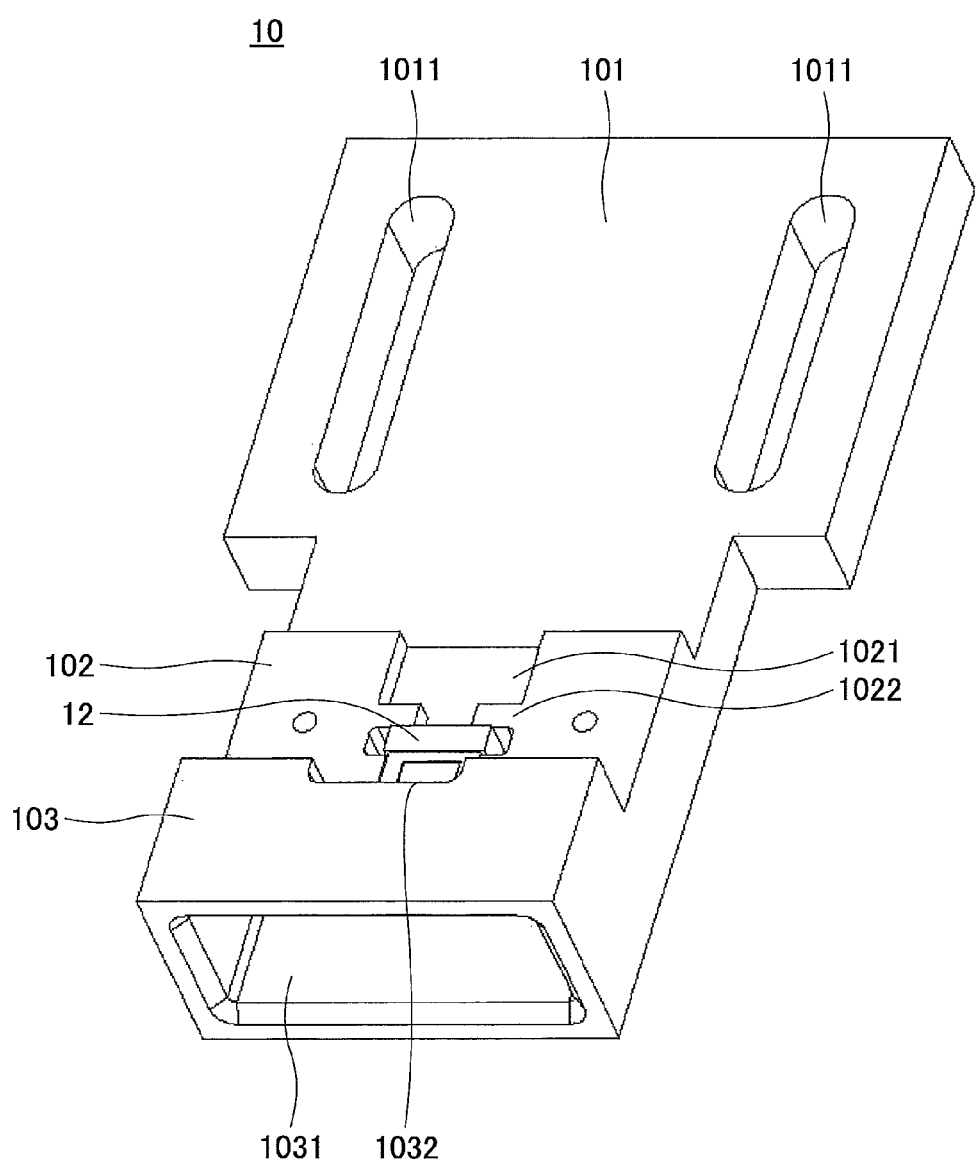
FIG. 4 is a perspective view illustrating an example of a structure of an SB-side first housing and an SB-side ferrule.
Figure 5:
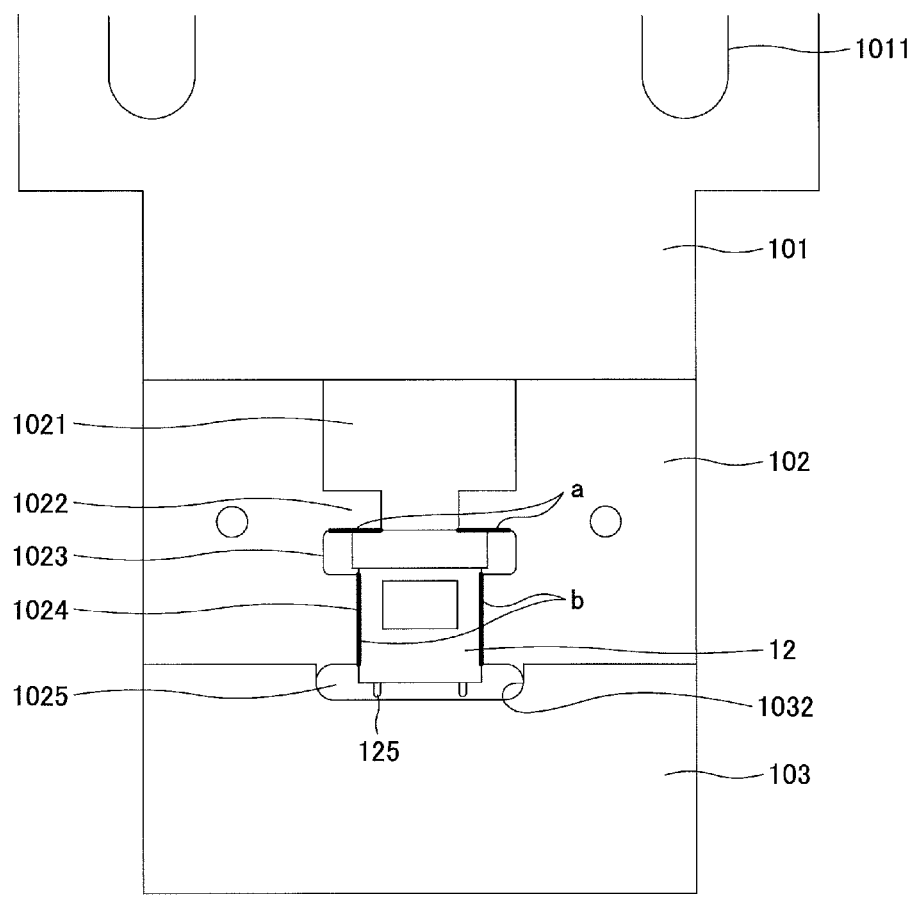
FIG. 5 is an elevation view illustrating an example of the structure of the SB-side first housing and the SB-side ferrule.

Next, a method of attaching the SB-side ferrule 12 to the SB-side first housing 10 is explained with reference to FIG. 4 to FIG. 6. FIG. 4 is a perspective view illustrating the SB-side first housing 10 and the SB-side ferrule 12. FIG. 5 is an elevation view illustrating the SB-side first housing 10 and the SB-side ferrule 12.

As illustrated in FIG. 4, the SB-side first housing 10 includes an SB-side fixing portion 101, an SB-side attachment portion 102 and an SB-side connecting portion 103.

The SB-side fixing portion 101 is provided with the long holes 1011 that function as an adjusting portion. The system board 3 is attached to the SB-side fixing portion 101 as illustrated in FIG. 2B. The SB-side ferrule 12 is attached to the SB-side attachment portion 102.

The SB-side connecting portion 103 is provided with an SB-side insertion hole 1031 and a slit 1032 for confirming a fitting state of ferrules.

The SB-side insertion hole 1031 has a tube form extending in the fitting direction $F_1$. The SB-side insertion hole 1031 functions as a guide for guiding the BP-side connector 2 when the SB-side connector 1 is connected to the BP-side connector 2. As illustrate in FIG. 11, a BP-side connecting portion 213 of the BP-side connector 2 is inserted in the SB-side insertion hole 1031 when the BP-side connector 2 is connected to the SB-side connector 1. An opening portion of the SB-side insertion hole 1031 is chamfered to adjust the position of the BP-side connecting portion 213 of the BP-side connector 2. Due to this configuration, when the BP-side connecting portion 213 of the BP-side connector 2 is inserted in the SB-side insertion hole 1031, the SB-side ferrule 12 and the BP-side ferrule 25 are adjusted at appropriate positions such that the SB-side ferrule 12 and the BP-side ferrule 25 face each other just before the SB-side ferrule 12 and the BP-side ferrule 25 are being fitted.

A function of the slit 1032 is explained later with reference to FIG. 16.

As illustrated in FIG. 5, the SB-side attachment portion 102 includes an SB-side optical waveguide laying portion 1021, a protruding portion 1022, an SB-side flange housing portion 1023, an SB-side ferrule width defining portion 1024, and an SB-side ferrule exposing portion 1025.

The SB-side optical waveguide laying portion 1021 is a portion on which the first optical waveguide 14, not illustrated in FIG. 5, is laid. The first optical waveguide 14 may be a single core or multi core optical fiber, or may be in an arbitrary form such as a ribbon or a sheet. The SB-side optical waveguide laying portion 1021 is formed to have a sufficient width in the width direction W so that the first optical waveguide 14 extending from the SB-side ferrule 12 can be bent.

The protruding portion 1022 is provided between the SB-side optical waveguide laying portion 1021 and the flange housing portion 1023 and protrudes in the width direction W. As discussed below, the protruding portion 1022 has two functions. The SB-side ferrule 12 is housed in the concave portion formed by the SB-side flange housing portion 1023 and the SB-side ferrule width defining portion 1024 while being in contact with surfaces "a" of the protruding portion 1022, illustrated by bold lines, facing the flange housing portion 1023. This means that the protruding portion 1022 stops the movement of the SB-side ferrule 12 in a direction opposite to the fitting direction $F_1$, in other words, in an upper direction in FIG. 5. Further, the protruding portion 1022 has a stops the movement of the guide pins 125, as will be explained later.

The SB-side flange housing portion 1023 is a concave portion in which the SB-side ferrule flange 122 of the SB-side ferrule 12 as illustrated in FIG. 7A to FIG. 7C is housed. The SB-side flange housing portion 1023 has a sufficient width in the width direction W to receive the SB-side ferrule flange 122 of the SB-side ferrule 12.

The SB-side ferrule width defining portion 1024 defines the position of the SB-side ferrule 12 in the width direction W at surfaces "b" as illustrated by bold lines in FIG. 5. There are provided slight spaces, between the SB-side ferrule width defining portion 1024 and the SB-side ferrule 12 in the width direction W. Accuracy in attachment of the SB-side ferrule 12 to the SB-side first housing 10 is determined by the spaces between the SB-side ferrule width defining portion 1024 and the SB-side ferrule 12.

The SB-side ferrule exposing portion 1025 is provided to expose an optical waveguide laying surface of the SB-side ferrule 12. Further, the SB-side ferrule exposing portion 1025 corresponds to the slit 1032 illustrated in FIG. 4 to facilitate confirmation of fitting.

Figure 6:
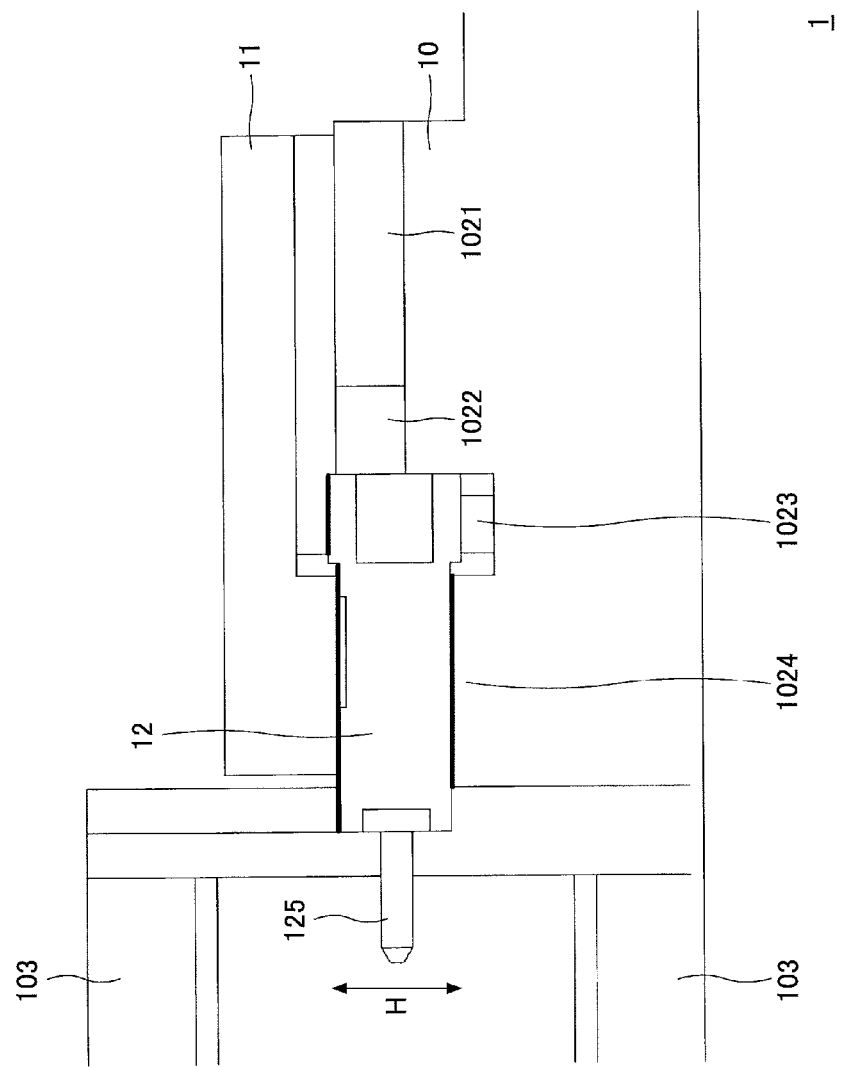
FIG. 6 is a cross-sectional view taken along an A-A line in FIG. 3.

FIG. 6 is a cross-sectional view of the SB-side connector 1 taken along an A-A line in FIG. 3 when the SB-side ferrule 12 is attached. As illustrated in FIG. 6, the SB-side ferrule 12 is set while having the guide pins 125 facing leftward in FIG. 6, in other words, the SB-side connecting portion 103. In this embodiment, there are provided slight spaces between the SB-side ferrule 12 and the SB-side ferrule width defining portion 1024 and between the SB-side ferrule 12 and the SB-side second housing 11, respectively. The SB-side ferrule 12 is positioned between the SB-side ferrule width defining portion 1024 and the SB-side second housing 11 while having the slight spaces therebetween so that the position of the SB-side ferrule 12 in the height direction H is determined.

This means that the SB-side ferrule 12 is positioned within the housings while having the slight spaces therebetween in the width direction W and in the height direction H. With this configuration, stress due to fastening of the housings or thermal expansion can be avoided. Thus, damage to the SB-side ferrule 12 can be prevented.

Figure 9:
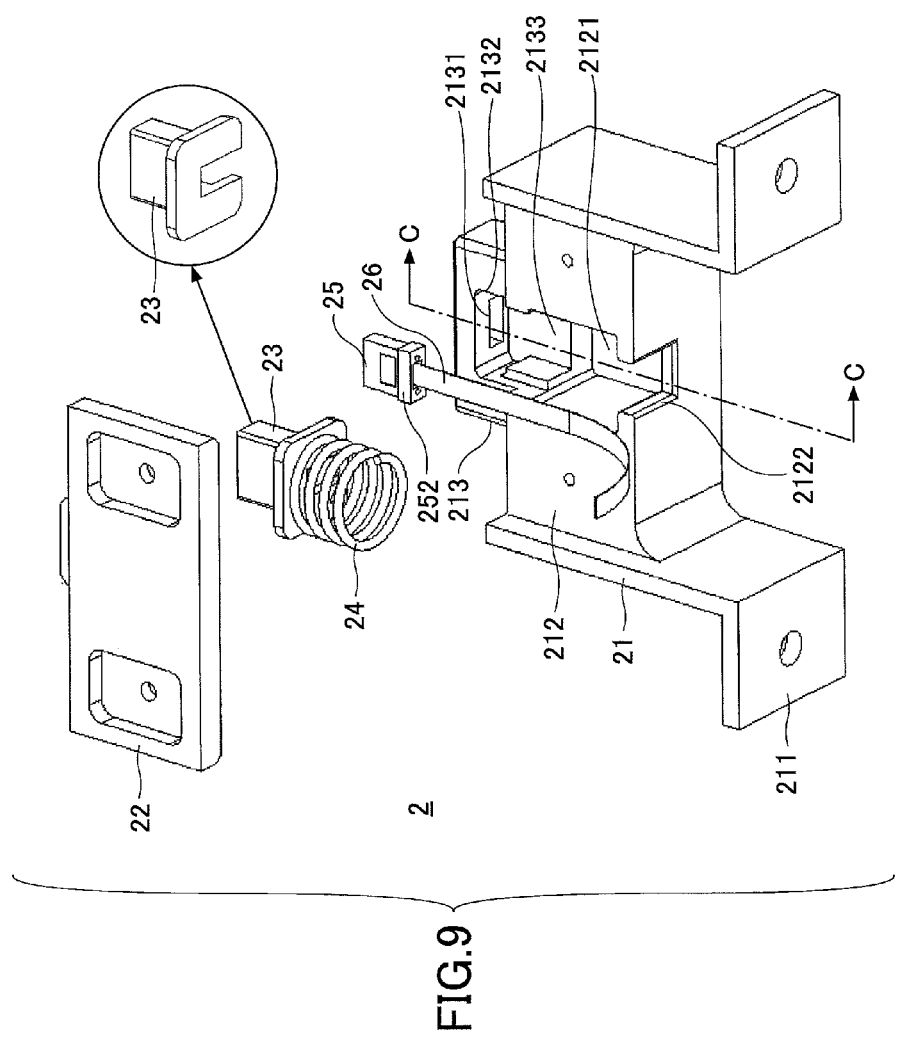
FIG. 9 is a perspective view illustrating a structure of a BP-side connector.
Figure 10:
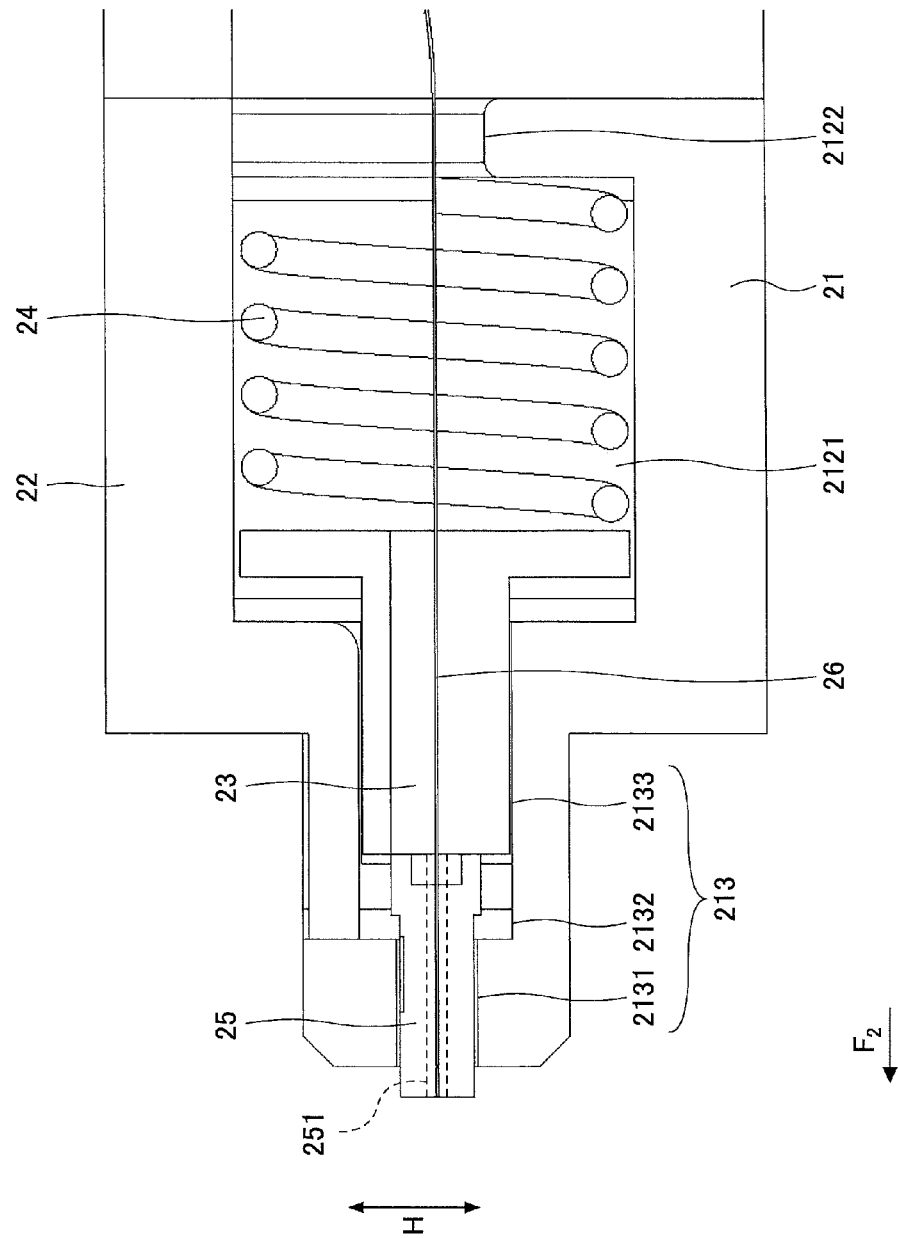
FIG. 10 is a cross-sectional view of the BP-side connector taken along a C-C line in FIG. 9.

Next, the BP-side connector 2 is explained in detail with reference to FIG. 9 and FIG. 10. FIG. 9 is a perspective view illustrating the BP-side connector 2. FIG. 10 is a cross-sectional view of the BP-side connector 2 taken along a C-C line in FIG. 9.

As illustrated in FIG. 9, the BP-side connector 2 includes a BP-side first housing 21, a BP-side second housing 22, a piston 23, a coil spring 24 and a BP-side ferrule 25 to which a second optical waveguide 26 is connected.

The BP-side first housing 21 includes a BP-side fixing portion 211, a BP-side attachment portion 212 and the BP-side connecting portion 213.

The BP-side attachment portion 212 includes a coil spring housing portion 2121 and a BP-side optical waveguide laying portion 2122. The BP-side fixing portion 211 is used to fix the BP-side connector 2 to the backplane board 4 in a direction orthogonal to a surface of the backplane board 4.

The BP-side connecting portion 213 is fitted with the SB-side connecting portion 103 to connect the BP-side connector 2 with the SB-side connector 1, as will be explained later with reference to FIG. 11. The BP-side connecting portion 213 includes a BP-side ferrule sliding portion 2131, a BP-side flange housing portion 2132 and a piston sliding portion 2133 provided internally. The BP-side ferrule 25 contacts with the BP-side ferrule sliding portion 2131 at its surface to be slid within the BP-side ferrule sliding portion 2131. The BP-side flange housing portion 2132 houses the BP-side ferrule flange 252. The piston 23 contacts with the piston sliding portion 2133 at its surface to be slid within the piston sliding portion 2133.

The BP-side second housing 22 functions as a cover of the BP-side connector 2. The piston 23 and the coil spring 24 function to push the BP-side ferrule 25, as will be explained later.

Figure 11:
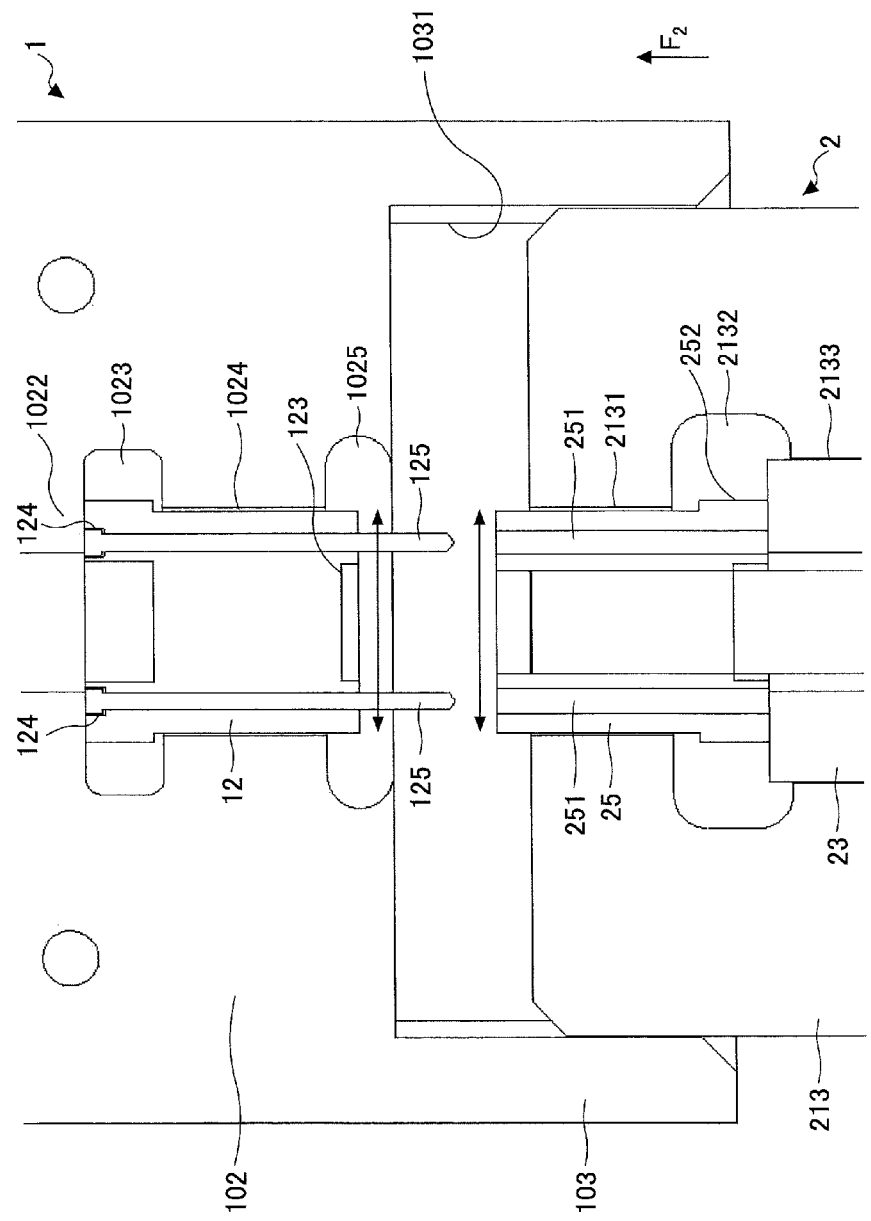
FIG. 11 is an elevation view illustrating a fitting portion of the SB-side connector and the BP-side connector in detail.

As illustrated in FIG. 10 and FIG. 11, the BP-side ferrule 25 is provided with guide pin fitting holes 251. The guide pin fitting holes 251 function to fit the guide pins 125 of the SB-side connector 1, respectively. In other words, the guide pin fitting holes 251 function as position determining portions that connects the first optical waveguide 14 of the SB-side ferrule 12 and the second optical waveguide 26 of the BP-side ferrule 25 with a predetermined accuracy.

The second optical waveguide 26 may be a single core or multi core optical fiber, or may be in an arbitrary form such as a ribbon or a sheet.

As illustrated in FIG. 10, the BP-side ferrule 25 is housed in the BP-side ferrule sliding portion 2131. There is provided a slight space between the BP-side ferrule 25 and the BP-side ferrule sliding portion 2131 in the height direction H so that the BP-side ferrule 25 and the BP-side ferrule sliding portion 2131 slide with respect to each other.

The piston 23 housed in the piston sliding portion 2133 is pushed by the coil spring 24 housed in the coil spring housing portion 2121 to push the BP-side ferrule 25 toward a fitting direction $F_2$. The coil spring 24 has a spring constant sufficient to push the BP-side ferrule 25 to be fitted with the SB-side ferrule 12. On the other hand, if a force that is larger than the force necessary for fitting of the BP-side ferrule 25 and the SB-side ferrule 12 is applied to the BP-side ferrule 25 via the piston 23, the BP-side ferrule 25 slides in the BP-side connecting portion 213 in a backward direction, a direction opposite to the fitting direction $F_2$. Thus, damage to the ferrules can be prevented. Further, a front end of the BP-side ferrule 25 is protruded from the BP-side ferrule sliding portion 2131, and it is possible to clean the front end portion of the BP-side ferrule 25.

The second optical waveguide 26 passes through the piston 23 and the coil spring 24 and is connected to the backplane board 4 after being drawn from the BP-side optical waveguide laying portion 2122. The BP-side first housing 21 is configured to retain a predetermined distance from a surface of the backplane board 4 to the BP-side optical waveguide laying portion 2122 so that the second optical waveguide 26 can be bent with a predetermined radius.

Next, an operation of the guide pin 125 is explained with reference to FIG. 11.

FIG. 11 is an elevation view illustrating a fitting portion of the SB-side connector 1 and the BP-side connector 2.

As described above, there are provided slight spaces between the SB-side ferrule 12 and the housings of the first connector 1 (the SB-side first housing 10 and the SB-side second housing 11) in the width direction W and in the height direction H. Similarly, as described above, there are provided slight spaces between the BP-side ferrule 25 and the housings of the BP-side connector 2 (the BP-side first housing 21 and the BP-side second housing 22) in the width direction W and in the height direction H. With these slight spaces, the SB-side ferrule 12 and the BP-side ferrule 25 are capable of moving freely in the width direction W and the height direction H, respectively.

Further, the guide pins 125 of the SB-side connector 1 are configured to fit in the guide pin fitting holes 251 of the BP-side connector 2, respectively. Thus, even when the SB-side ferrule 12 and the BP-side ferrule 25 are positioned at opposite sides from each other, first, for example, positions of the SB-side ferrule 12 and the BP-side ferrule 25 can be adjusted when the guide pins 125 are inserted in the guide pin fitting holes 251, respectively. Further, as the tapered portion 1253 is provided at the front end of the guide pin 125, the guide pin 125 can be easily fitted in the respective guide pin fitting hole 251.

A front end portion of the BP-side connecting portion 213 is chamfered and is inserted into the SB-side connecting portion 103 that is also chamfered, as described above. Further, the system board 3 to which the SB-side connector 1 is attached is slidably attached to a slot of a system rack, not illustrated in the drawings. With this configuration, the SB-side connecting portion 103 of the SB-side connector 1 and the BP-side connecting portion 213 of the BP-side connector 2 can be connected in such a way that an attachment error caused between the system board 3 and the system rack can be eliminated.

The guide pin 125 is provided with the tapered portion 1253 at its front end as explained above with reference to FIG. 8. When the guide pin 125 fits in the respective guide pin fitting hole 251 provided at the BP-side ferrule 25, the positions of the SB-side ferrule 12 and the BP-side ferrule 25 are determined.

As described above, the SB-side ferrule 12, the BP-side ferrule 25 and the guide pin 25 are movably attached to the respective SB-side or BP-side housing (10, 11, 21 or 22) or the guide pin insertion hole 124 with the slight space therebetween. Thus, damage due to fastening of the housings or the like can be prevented.

Further, in this embodiment, there is provided a slight space between the BP-side connecting portion 213 and the SB-side connecting portion 103. Thus, the BP-side connecting portion 213 and the SB-side connecting portion 103 move relative with respect to each other in an amount defined by the slight space when the SB-side connector 1 and the BP-side connector 2 are connected.

The tapered portion of the guide pin 125 is designed taking into consideration the sizes of the slight spaces explained above. The guide pin 125 is capable of absorbing misalignment/attachment errors of the SB-side connector 1 and the BP-side connector 2 within a range, at most, corresponding to radius of the guide pin 125 in a diameter direction of the tapered portion 1253. Thus, the diameter (or radius) of the guide pin 125 may be determined based on the design of the optical connector such as the slight spaces between the housing and the ferrule, the slight spaces between the guide pin and the guide pin insertion hole, or the like, as described above.

Further, when the SB-side ferrule 12 is attached to the SB-side attachment portion 102, the protruding portion 1022 contacts the flange portion 1252 of the guide pin 125 at the surfaces "a" (see FIG. 5) so that the guide pin 125 inserted in the respective guide pin insertion hole 124 is prevented from moving and is removed in a direction opposite to the fitting direction $F_1$. This means that the protruding portion 1022 has stops the movement of the guide pins 125.

A method of fitting the SB-side connector 1 and the BP-side connector 2 is explained in detail with reference to FIG. 12A to FIG. 15B.

Figure 12A:
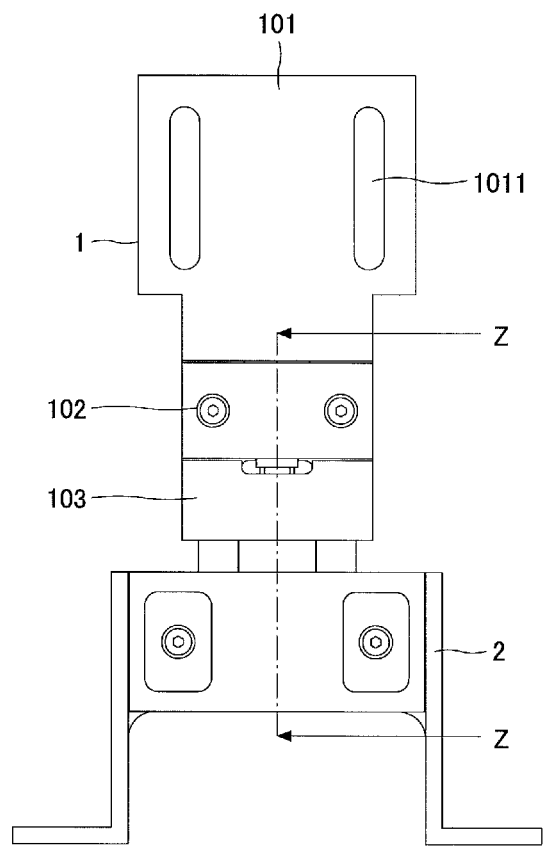
FIG. 12A to FIG. 12D are views illustrating an example of the optical connector before being fitted.
Figure 12B:
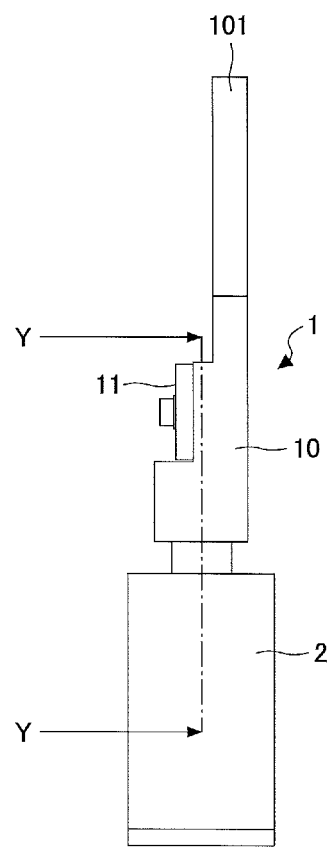
Figure 12C:
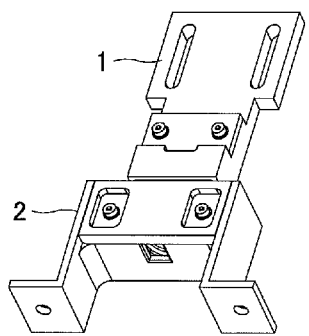
Figure 12D:
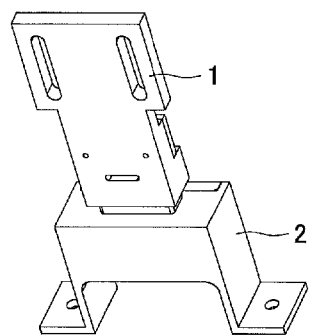

FIG. 12A is an elevation view, FIG. 12B is a side view, and FIG. 12C and FIG. 12D are respective perspective views, of the optical connector before being fitted. FIG. 13A is a cross-sectional elevation view and FIG. 13B is a cross-sectional side view, of the optical connector before being fitted. The numerals are the same as those explained with reference to FIG. 1 to FIG. 11.

As illustrated in FIG. 12A to FIG. 13B, the SB-side connector 1 has a structure in which the SB-side first housing 10 and the SB-side second housing 11 are fixed by screws, and the SB-side ferrule 12 is contained within the housings.

FIG. 13A corresponds to a cross-sectional view taken along a Y-Y line illustrated in FIG. 12B. FIG. 13A illustrates a state in which the SB-side connector 1 and the BP-side connector 2 are not fitted yet but the BP-side connecting portion 213 of the BP-side connector 2 is inserted in the SB-side connecting portion 103. The SB-side ferrule 12 is attached to the SB-side attachment portion 102 and is covered by the SB-side second housing 11. At this time, the SB-side ferrule 12 is movable within a range of the slight spaces between the SB-side attachment portion 102 and the SB-side ferrule 12. As the SB-side ferrule 12 is attached to the SB-side attachment portion 102, the guide pins 125 are stopped by the protruding portion 1022 of the SB-side attachment portion 102 even when the SB-side ferrule 12 is pushed by the BP-side ferrule 25. Thus, just before the SB-side connector 1 and the BP-side connector 2 are fitted, the tapered portion 1253 at the front end portion of each of the guide pins 125 explained above with reference to FIG. 8 is positioned to face the respective guide pin fitting hole 251 of the BP-side ferrule 25. The BP-side ferrule 25 protrudes from the BP-side first housing 21 by being pushed by the piston 23 that is pushed by the coil spring 24. This means that the SB-side ferrule 12 and the BP-side ferrule 25 face each other at floating states, respectively. Thus, even when the system board 3, to which the SB-side connector 1 is attached as illustrated in FIG. 1, is attached to the system rack, attachment error of the system board 3 and the system rack can be absorbed by the SB-side connector 1 and the BP-side connector 2 when connecting these connectors as the SB-side ferrule 12 and the BP-side ferrule 25 face each other at a floating state.

Further, as described above, there are spaces between the SB-side connector 1 and the SB-side ferrule 12, between the BP-side connector 2 and the housings, and between the BP-side ferrule 25 and the housings. However, when the tapered portions 1253 of the guide pins 125 are inserted in the guide pin fitting hole 251, the positions of the SB-side ferrule 12 and the BP-side ferrule 25 are adjusted within a range of the spaces between each of the guide pins 125 and the SB-side ferrule 12 and between each of the guide pins 125 and the respective guide pin fitting hole 251.

With this configuration, optical connectors can be appropriately connected at the same time as attaching the system board 3 to the system rack. Thus, workability can be increased in an optical backplane apparatus in which a plurality of the system boards 3 are orthogonally connected to the backplane board 4.

Figure 14A:
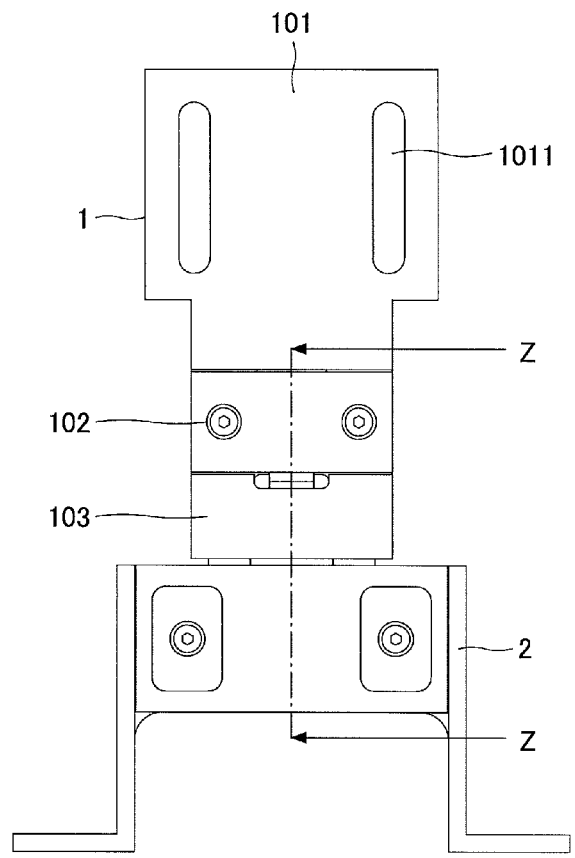
FIG. 14A to FIG. 14D are views illustrating an example of the optical connector after being fitted.
Figure 14B:
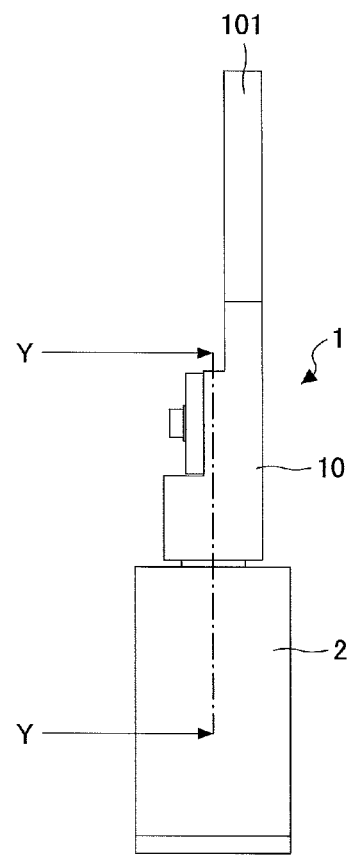
Figure 14C:
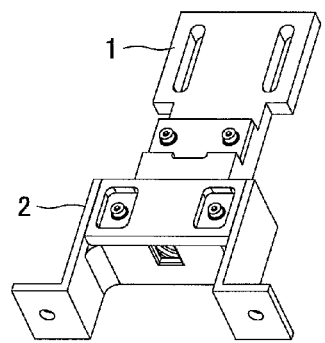
Figure 14D:
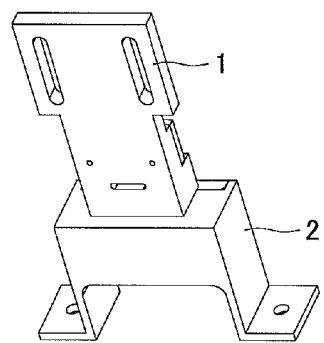

FIG. 14A is an elevation view, FIG. 14B is a side view, and FIG. 14C and FIG. 14D are respective perspective views, of the optical connector after being fitted. FIG. 15A is a cross-sectional elevation view and FIG. 15B is a cross-sectional side view, of the optical connector after being fitted. FIG. 14A to FIG. 15B correspond to FIG. 12A to FIG. 13B, respectively and illustrate a state when the optical connector is fitted.

As illustrated in FIG. 14A to FIG. 15B, the SB-side connector 1 and the BP-side connector 2 are connected. At this time, the guide pins 125 are fitted in the guide pin fitting holes 251 of the BP-side ferrule 25, respectively, and the optical waveguide laying surfaces of the SB-side ferrule 12 and the BP-side ferrule 25 contact with each other at an appropriate position. The BP-side ferrule 25 is pushed by the SB-side ferrule 12 and the piston 23 pushed by the coil spring 24 moves backward. The contacting force of the SB-side ferrule 12 and the BP-side ferrule 25 is determined in accordance with a spring constant of the coil spring 24 and an amount moved by the coil spring 24. With this configuration, a contacting force sufficient to stably forming an optical waveguide can be obtained.

Next, a method of confirming a fitting state of the SB-side connector 1 and the BP-side connector 2 is explained with reference to FIG. 16.

Figure 16:
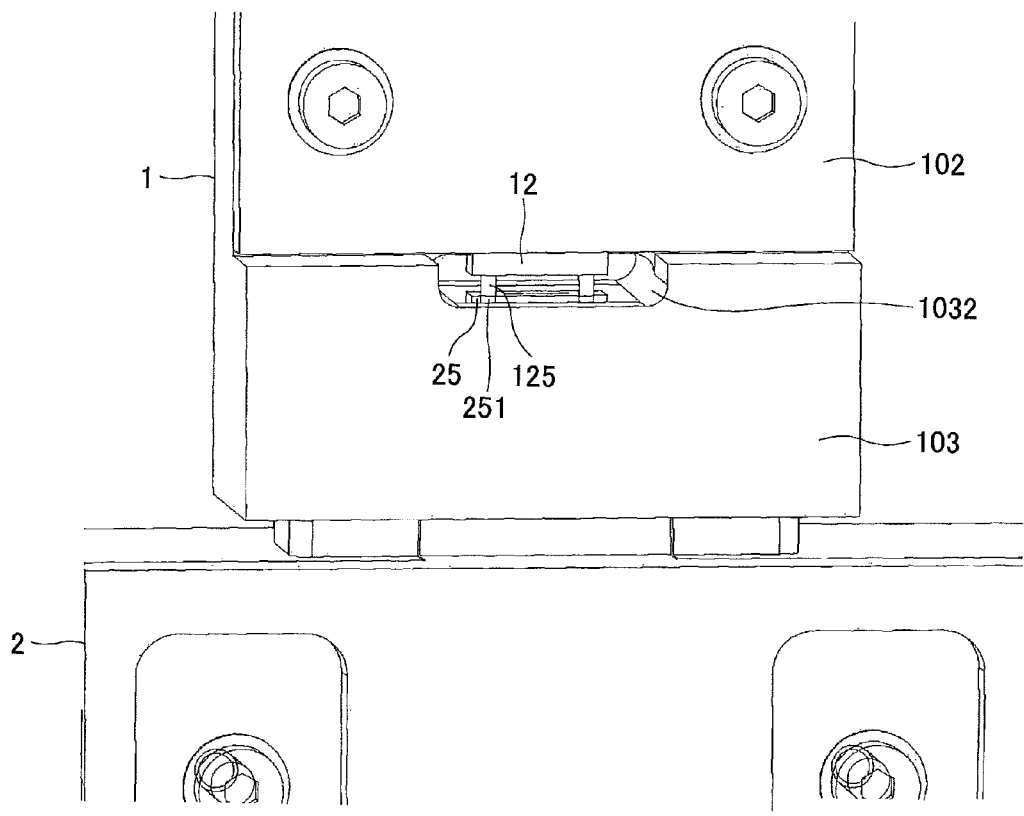
FIG. 16 is a perspective view illustrating a fitting portion of the SB-side connector and the BP-side connector.

FIG. 16 is a perspective view illustrating a fitting portion of the SB-side connector and the BP-side connector. FIG. 16 illustrates a fitting state between the SB-side ferrule 12 and the BP-side ferrule 25 just before they are fitted.

Due to the slit 1032 provided at the SB-side connecting portion 103, a fitting state between the guide pins 125 of the SB-side ferrule 12 and the guide pin fitting holes 251 of the BP-side ferrule 25 can be confirmed. Even when the SB-side connector 1 is pushed toward the BP-side connector 2 and the SB-side connecting portion 103 and the BP-side connecting portion 213 are fitted with each other, if the guide pins 125 are not fitted to the guide pin fitting holes 251, respectively, for example, a state that the guide pins 125 are exposed can be confirmed through the slit 1032. In this embodiment, the slit 1032 for confirming the fitting state of the ferrules is provided. Further, the SB-side ferrule 12 and the BP-side ferrule 25 face each other at floating states while the SB-side ferrule 12 and the BP-side ferrule 25 are to be fitted by the pushing force of the coil spring 24. Thus, even if there is a slight positioning misalignment between the SB-side ferrule 12 and the BP-side ferrule 25, the positions of the SB-side ferrule 12 and the BP-side ferrule 25 can be adjusted while confirming their positions through the slit 1032.

According to the embodiment, an optical connector capable of easily and surely connecting optical waveguides of different boards is provided.

Although a preferred embodiment of the optical connector, the optical connector system and the optical backplane apparatus has been specifically illustrated and described, it is to be understood that modifications may be made therein without departing from the spirit and scope of the invention as defined by the claims.

The present invention is not limited to the specifically disclosed embodiments, and numerous variations and modifications and modifications may be made without departing from the spirit and scope of the present invention.

What is claimed is:

1. An optical connector for optically connecting a first optical waveguide and second optical waveguide, comprising:
   a first connector module including
      a first fixing portion attached to a first board in such a manner that a fixed position is adjustable,
      a first connecting portion,
      a first ferrule to which the first optical waveguide is connected, and
      a guide pin attached to the first ferrule and provided with a tapered portion at a front end; and
   a second connector module including
      a second fixing portion fixed to a second board,
      a second connecting portion connectable to the first connecting portion of the first connector module,
      a second ferrule to which the second optical waveguide is connected and provided with a fitting hole that fits the guide pin, and
      a holding unit that movably holds the second ferrule.

2. The optical connector according to claim 1, wherein the guide pin is inserted into the first ferrule, in a manner that the guide pin is prevented from pulled out from the first ferrule when the first ferrule is attached to the first connector module.

3. The optical connector according to claim 1, wherein the holding unit is configured to push the second ferrule toward the first ferrule by a spring.

4. The optical connector according to claim 1, further comprising:
   a viewing portion capable of being used for viewing a fitting state of the first ferrule and the second ferrule.

5. An optical connector system comprising:
   the optical connector according to claim 1;
   a first optical waveguide connected to the first ferrule of the first connector module; and
   a second optical waveguide connected to the second ferrule of the first connector module.

6. An optical backplane apparatus comprising:
   a plurality of the optical connectors according to claim 1;
   a plurality of first boards; and
   a second board to which the plurality of the first boards are connected via the plurality of the optical connectors, respectively.

7. A first connector module comprising:
   a first fixing portion attached to a first board in such a manner that a fixed position is adjustable,
   a first connecting portion,
   a first ferrule to which a first optical waveguide is connected, and
   a guide pin attached to the first ferrule and provided with a tapered portion at a front end.

8. The optical connector according to claim 1, further comprising:
   a first housing, the first fixing portion and the first connecting portion forming a part of the first housing;
   a second housing, the second fixing portion and the second connecting portion forming a part of the second housing;
   wherein the first ferrule is set in the first housing such that a space is provided around the first ferrule and the first housing for moving freely in the first housing, and
   wherein the second ferrule is set in the second housing such that a space is provided around the second ferrule and the second housing for moving freely in the first housing.

9. The optical connector according to claim 8,
   wherein the holding unit is configured to push the second ferrule toward the first ferrule by a spring, and
   wherein when fitting the first ferrule and the second ferrule, the first ferrule and the second ferrule are positioned to face each other at floating states in the first housing and the second housing, respectively, while the first ferrule and the second ferrule are to be fitted by the pushing force of the spring.

10. The optical connector according to claim 1,
    wherein the first connecting portion is provided with a slit at a position capable of viewing a fitting state of the guide pin attached to the fitting hole of the second ferrule.

11. The first connector module according to claim 7, further comprising:
    a first housing, the first fixing portion and the first connecting portion forming a part of the first housing,
    wherein the first ferrule is set in the first housing such that a space is provided around the first ferrule and the first housing for moving freely in the first housing.

* * * * *